United States Patent [19]

Kato

[11] Patent Number: 5,737,070
[45] Date of Patent: Apr. 7, 1998

[54] DISPLACEMENT INFORMATION MEASURING APPARATUS

[75] Inventor: Shigeki Kato, Utsunomiya, Japan

[73] Assignee: Canon Kabushiki Kaisha, Tokyo, Japan

[21] Appl. No.: 642,511

[22] Filed: May 3, 1996

[30] Foreign Application Priority Data

May 12, 1995 [JP] Japan .................................. 7-138429

[51] Int. Cl.$^6$ ...................................................... G01P 03/36
[52] U.S. Cl. ........................................ 356/28.5; 356/356
[58] Field of Search ................................ 356/356, 28.5

[56] References Cited

U.S. PATENT DOCUMENTS

| | | | |
|---|---|---|---|
| 5,216,478 | 6/1993 | Kadowaki et al. | 356/28.5 |
| 5,327,222 | 7/1994 | Takamiya et al. | 356/356 |
| 5,502,466 | 3/1996 | Kato et al. | 356/356 |
| 5,629,793 | 5/1997 | Takamiya et al. | 359/278 |
| 5,640,239 | 6/1997 | Takamiya et al. | 356/345 |

FOREIGN PATENT DOCUMENTS 4230885  8/1992  Japan .

*Primary Examiner*—Mark Hellner
*Attorney, Agent, or Firm*—Fitzpatrick, Cella, Harper & Scinto

[57] ABSTRACT

An apparatus for measuring information about displacement of an object includes a light source having the wavelength of its emitted light beam varied by a temperature change, a diffraction grating for diffracting the light beam from the light source, an optical system having first and second lens systems for deflecting the diffracted light beam from the diffraction grating and applying it to the object, a photodetector for detecting scattered light subjected to a Doppler shift from the object to which the diffracted light beam is applied, the information about the displacement of the object being measured based on a Doppler signal obtained by detection of the scattered light by the photodetector, and a mounting mechanism for restricting the positional relation between the first and second lens systems, the mounting mechanism varying the spacing between the first and second lens systems by a temperature change. The coefficient of thermal expansion of some member of the mounting mechanism is set so that a variation in the spacing between the first and second lens systems caused by a temperature change may substantially offset a variation in the Doppler signal attributable to the wavelength of the emitted light beam from the light source varied with the same temperature change.

11 Claims, 3 Drawing Sheets

DISPLACEMENT INFORMATION MEASURING APPARATUS

BACKGROUND OF THE INVENTION

1. Field of the Invention

This invention relates to a displacement information measuring apparatus, and can be well applied, for example, to a displacement information measuring apparatus utilizing the Doppler effect which is designed to apply a laser beam to a moving object, a fluid or the like (hereinafter referred to as the "moving object,") and to detect the shift of the frequency of scattered light subjected to a Doppler shift in conformity with the movement velocity of the moving object in this way, the displacement information is measured about the displacement of the moving object or the movement velocity of the moving object, without contacting the object.

2. Related Background Art

A laser Doppler velocity meter has heretofore been used as an apparatus for measuring the movement velocity of a moving object without contacting the object and with high accuracy. The laser Doppler velocity meter applies a laser beam to the moving object and measures the movement velocity of the moving object by the utilization of the effect (Doppler effect) that the frequency of the scattered light from the moving object shifts in proportion to the movement velocity of the moving object.

As an example, a schematic view of the essential portions of a laser Doppler velocity meter proposed in Japanese Laid-Open Patent Application No. 4-230885 is shown in FIG. 1 of the accompanying drawings. In FIG. 1, the reference numeral 101 designates a laser Doppler velocity meter. The reference numeral 1 denotes a laser, the reference numeral 2 designates a collimator lens, the reference numeral 7 denotes an object to be measured as a moving object, the reference numeral 10 designates a diffraction grating of grating pitch d, and the reference numerals 11 and 12 denote first and second lenses each having a focal length f, and these are arranged and constructed as shown. When the distance from the diffraction grating 10 to the first lens 11 is a and the distance from the second lens 12 to the object to be measured (moving object) 7 is b, a and b satisfy the relation that a+b=2f.

A laser beam having a wavelength $\lambda$ of about 0.68 μm from the laser diode 1 is made into a parallel light beam 3 having a diameter of 1.2 mmφ by the collimator lens 2 and enters the transmission type diffraction grating 10 having a Grating pitch d of 3.2 μm perpendicularly to the direction of grating arrangement. At this time, the angle of diffraction $\theta$ of ±1st-order diffracted lights 5a and 5b is an angle of diffraction $\theta_1 = 12°$ from d sin $\theta = m\lambda$ (m=1).

When the light beams 5a and 5b enter the first lens 11 of the focal length f (=15 mm), there are provided light beams 13a and 13b as shown. When the light beams 13a and 13b enter the second lens 12 spaced apart by 2f (=30 mm) from the first lens, there are again provided parallel light beams 14a and 14b, which assume a spot diameter of 1.2 mmφ at an angle equal to the angle of diffraction $\theta_1$ from the diffraction grating 10 and irradiate the object 7 to be measured moving at a velocity V (mm/sec.).

The scattered light from the object 7 to be measured is efficiently condensed onto the light receiving portion 9a of a photodetector 9 by the second lens 12 and a condensing lens 8. At this time, a change in the light and shade by the scattered lights of the two light beams 14a and 14b occurs on the surface of the light receiving portion 9a. In the detecting unit 9, there is detected an optical signal (Doppler frequency F) in which a Doppler signal indicated by an expression (a) below is contained. The velocity information of the moving object 7 is then obtained by calculating means 24 by the use of expression (a).

$$F = 2V/d = V/1.6 \text{ (kHz)} \tag{a}$$

Here, for example, a=10 mm and b=20 mm, and b becomes relatively long and the working distance is made great to thereby make the degree of freedom of the installation of the velocity meter great.

Assuming here that the wavelength $\lambda$ of the laser beam from the laser diode 1 has changed, the angle of diffraction $\theta$ fluctuates correspondingly to d sin $\theta = \lambda$, while the Doppler signal F does not fluctuate.

The Doppler velocity meter shown in FIG. 1 is of a construction in which the angle of diffraction from the grating 10 and the angle of incidence on the object 7 to be measured are equal to each other. Thus, even when the laser wavelength changes, the Doppler signal does not fluctuate and highly accurate velocity measurement is realized. Recently, however, there has become required a construction in which the working distance can be greater.

If a construction in which the angle of diffraction≠the angle of intersection is adopted, for example, such a construction that "the grating pitch<the interference fringe pitch on the object to be measured" is adopted, the degree of freedom of optical design will become great and for example, the working distance can be easily made long. With such a construction, however, the oscillation wavelength from a semiconductor laser generally has a temperature characteristic and when the laser wavelength changes with a change in temperature, the angle of diffraction $\theta = \sin^{-1} (\lambda/a)$ fluctuates and as a result, it affects the interference fringe pitch.

SUMMARY OF THE INVENTION

It is an object of the present invention to provide a displacement information measuring apparatus utilizing Doppler effect which can highly accurately detect the displacement information of a moving object.

Other objects of the present invention will become apparent from the following description of some embodiments of the invention.

DESCRIPTION OF THE PREFERRED EMBODIMENTS

Figure 1:
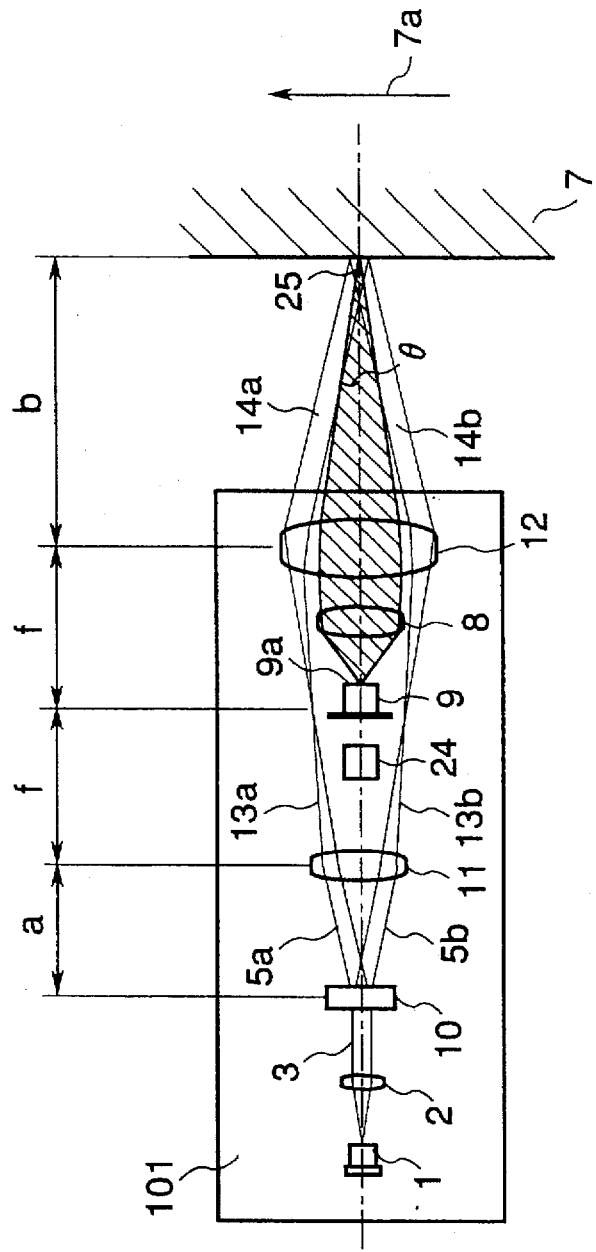
FIG. 1 is a schematic view of a Doppler velocity meter according to the prior art.
Figure 2:
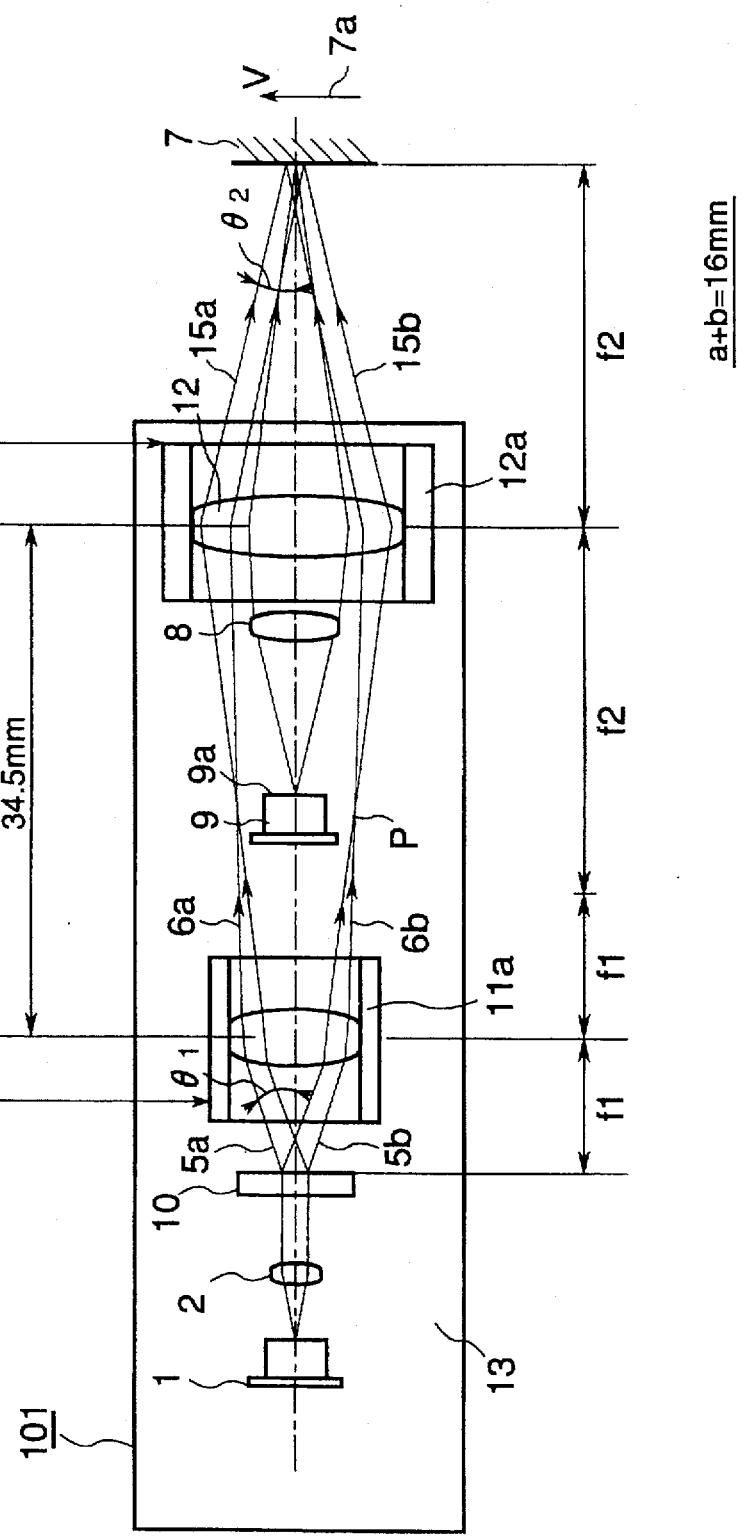
FIG. 2 is a plan view of the essential portions of Embodiment 1 of the present invention.

FIG. 2 is a plan view of the essential portions of Embodiment 1 of the present invention.

In this embodiment, there is shown a case where a moving object 7 is moving in the plane of the drawing sheet of FIG. 2 (the plane of movement) at velocity V as indicated by arrow 7a. In FIG. 2, the reference numeral 101 designates a velocity meter (displacement information measuring apparatus).

The reference numeral 1 denotes a light source comprising, for example, a laser diode or the like (hereinafter referred to as the "laser") and emitting a laser beam of a wavelength λ=0.68 μm. The reference numeral 2 designates a collimator lens which makes the light beam from the laser 1 into a parallel light beam 3 having a diameter of 2 mm. The reference numeral 10 denotes a diffraction grating comprising, for example, a transmission type diffraction grating of which the grating pitch d is 3.2 μm, and set so that ±1st-order diffracted lights may be diffracted at an angle of diffraction θ1 (θ1=12°).

The reference numeral 11 designates a first lens of a focal length f1 held in a first holding member 11a. The reference numeral 12 denotes a second lens of a focal length f2 held in a second holding member 12a. The first holding member and the second holding member are supported by a base member 13 of a coefficient of thermal expansion differing from the coefficient of thermal expansion thereof.

The first lens 11 condenses ±1st-order diffracted lights 5a and 5b from the diffraction grating 10 and makes them into light beams 6a and 6b, and condenses them at a point P, whereafter it directs them to the second lens 12. The second lens 12 makes the light beams 6a and 6b emerge as parallel light beams 15a and 15b, and makes these parallel beams enter the moving object 7 at an angle of incidence (an angle of application) θ2 so that the both light beams may be superposed one upon the other.

The first lens 11 and the second lens 12 are disposed so that the spacing therebetween may be nearly $f_1+f_2$. The reference numeral 7 designates the moving object or moving fluid (hereinafter referred to as the "moving object") which is moving at movement velocity V in the direction of arrow 7a.

The reference numeral 8 denotes a condensing lens which condenses the reflected light from the moving object 7 through the second lens 12 and directs it to a photodetector (detecting means) 9.

In the present embodiment, the laser beam emitted from the laser 1 is made into a parallel light beam 3 by the collimator lens 2 and enters the diffraction grating 10 perpendicularly thereto. The ±1st-order diffracted lights 5a and 5b from the diffraction grating 10 emerge at an angle of diffraction θ1 and enter the first lens 11. The diffracted lights 5a and 5b are condensed as light beams 6a and 6b at the point P by the first lens 11, and thereafter enter the second lens 12.

At this time, the light beams 6a and 6b are made to enter the second lens 12 spaced apart by a distance $f_1+f_2$, and are again made into parallel light beams 15a and 15b in the velocity measuring direction, and these parallel light beams are applied to the moving object 7 at an angle of incidence θ2.

The scattered light from the object 7 to be measured is efficiently condensed onto the light receiving portion 9a of the photodetector 9 by the second lens 12 and the condensing lens 8 to thereby produce an optical signal in which a Doppler signal F indicated by expression (1) is contained.

$$F=2V \sin \theta_2/\lambda \quad (1)$$

When here, the wavelength λ of the light beam from the laser diode 1 is varied by an environmental change (a temperature change), the angle of diffraction θ1 fluctuates correspondingly according to the relation $$d \sin \theta_1 = \lambda. \quad (2)$$

If at this time, $$f_1 \tan \theta_1 = f_2 \tan \theta_2,$$

from $\sin \theta \equiv \tan \theta \equiv \theta$, the Doppler signal F becomes $$F=2Vf_1/f_2 d=V/2.5 \text{ (kHz)} \quad (3)$$

and though approximately, there can be realized an optical system free of wavelength dependency. So, the value of the Doppler signal F is found from the output of the photodetector 9, and the velocity V is calculated from expression (3) by a calculator, not shown.

In the present embodiment, however, to keep the working distance great, $$f_1 \tan \theta_1 \neq f_2 \tan \theta_2.$$

As a result, when the wavelength λ of the light beam from the laser diode 1 varies, the Doppler signal F gives birth to an error from expression (1).

For example, in a construction wherein the pitch d of the diffraction grating 10 is 3.2 μm and the pitch of interference fringes is 5 μm, the detection errors of Table 1 below occur due to temperature changes (taking as an example a semiconductor laser in which a wavelength fluctuation of 679.5→685.1→690.8 nm takes place for a temperature change of 0°→22.5°→45° C.).

TABLE 1

| | | |
|---|---|---|
| 0° C. | 679.5 nm | 0.070% |
| 22.5° C. | 685.1 nm | 0.004% |
| 45° C. | 690.8 nm | −0.062% |

Also, as regards an error for the positional deviation of the lenses, the deviation for the distance between the first lens 11 and the second lens 12 is greatest in the degree of influence, and the detection errors of Table 2 below occur for the positional deviation.

TABLE 2

| | |
|---|---|
| +17 μm | +0.068% |
| 0 μm | −0.004% |
| −17 μm | −0.067% |

These are shown in terms of the detection errors of the signal, but substantially coincide with the change (error) in the pitch of interference fringes.

So, in the present embodiment, the first holding member 11a holding the first lens 11, the second holding member 12a holding the second lens 12 and the base member 13 supporting the first and second holding members are formed of materials having appropriate coefficients of thermal expansion so that an error by a change in the angle of application of the light beam to the moving object 7 caused by the wavelength of the light beam from the laser diode 1 being varied by a temperature change may be substantially offset and corrected (cancelled) by an error attributable to a change in the distance between the first and second lenses caused by the thermal expansion of these lenses.

Specifically, a magnesium alloy ($\alpha=26\times10^{-6}$) exhibiting thermal expansion of ±17 μm for a temperature change of ±22.5° C. for the distance 34.5 (mm) between the first lens 11 and the second lens 12 is used for the holding members of the first lens and the second lens, aluminum (A3003, $\alpha=23.2\times10^{-6}$) is used for the base member 13, and the lenses are set at lens barrel fixing positions (screwing positions) as indicated in FIG. 2. Thereby, an error for the temperature change ±22.5° C., i.e., the detection error of the Doppler signal F, is corrected. Specifically, if design is made such that an optical error due to the fluctuation of the wavelength is offset so as to become equal to or less than 0.01% for the temperature change ±22.5° C., this means that the error has been suppressed to below the noise during measurement.

Figure 3:
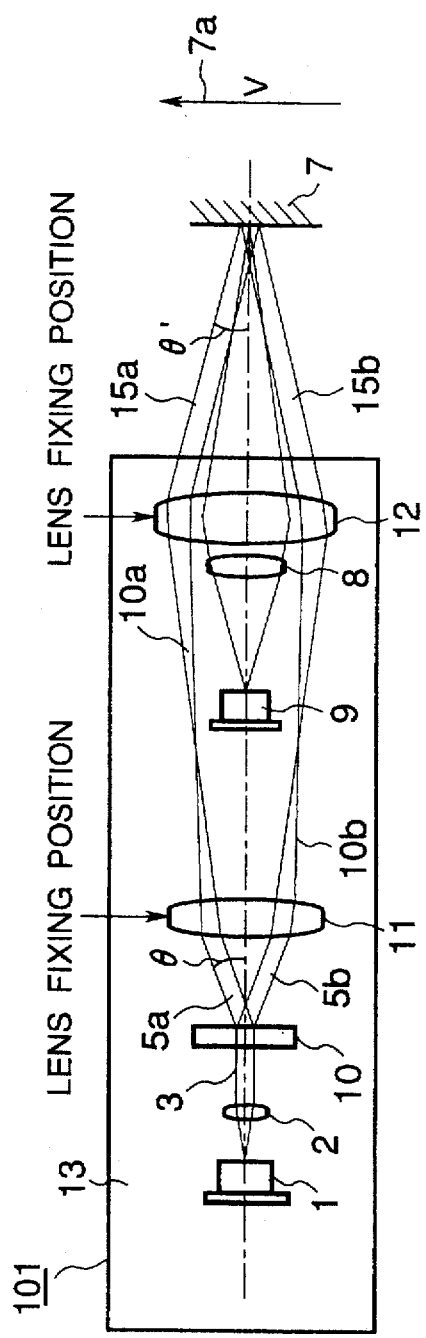
FIG. 3 is a plan view of the essential portions of Embodiment 2 of the present invention.

FIG. 3 is a plan view of the essential portions of a second embodiment of the present invention.

This embodiment differs from Embodiment 1 of FIG. 2 in that the lenses 11 and 12 are fixed directly to the base member 13. The lenses are disposed so that the laser beam emitted from the laser diode 1 may become rectilinearly polarized light on the Z-axis, and the laser beam is made into a parallel light beam 3 by the collimator lens 2. The parallel light beam 3 is diffracted at an angle θ by the diffraction grating 10 and is divided into two light beams 5a and 5b, which enter the convex lens 11. The light beams become convergent light beams 10a and 10b, but are again made into parallel light beams 15a and 15b by the lens 12, and these parallel light beams are applied to the object 7 to be measured moving at velocity V, at an angle of incidence θ'. The scattered light by the object or fluid is detected by the photodetector 9 through the condensing lens 8. Ideally, if the angle of diffraction θ=the angle of application θ', an optical error will hardly occur. In the present embodiment, however, θ≠θ' is adopted to keep the working distance great. When θ≠θ', an optical error theoretically occurs. For example, in a construction wherein the pitch of the diffraction grating is 3.2 μm and the pitch of interference fringes is 5 μm, the errors of Table 3 below occurs.

TABLE 3

| 0° C. | 679.5 nm | 0.070% |
|---|---|---|
| 22.5° C. | 685.1 nm | 0.004% |
| 45° C. | 690.8 nm | −0.062% |

Also, as regards the error for the positional deviation of the lenses, the deviation for the distance between the lens 4 and the lens 8 is greatest in the degree of influence and the errors of Table 4 below occurs for the positional deviation.

TABLE 4

| +15 μm | +0.058% |
|---|---|
| 0 μm | −0.004% |
| −15 μm | −0.062% |

With that has been described above taken into account, in the present embodiment, such materials are chosen that the lens 4 and the lens 8 do optimum positional deviation, that is, the error attributable to a change in the wavelength of the laser diode caused by a temperature change and the error attributable to the fluctuation of the distance between the lenses 4 and 8 caused by the thermal expansion thereof are offset. In the actual design, for the distance 34.5 (mm) between the lens 4 and the lens 8, a material exhibiting thermal expansion of 15 μm for a temperature change of ±22.5° C., for example, brass ($\alpha=19.9\times10^{-6}$) substantially eliminates an optical error.

While each of the first lens 11 and the second lens 12 is a single lens, each of them may be replaced by an equivalent optical system comprising a plurality of lenses.

As described above, the first holding member holding the first lens for condensing the diffracted light created from the diffraction grating, the second holding member holding the second lens, and the base member supporting the first and second holding members are formed of materials of appropriate coefficients of thermal expansion, and the optical error caused by the difference between the angle of diffraction and the angle of application is cancelled by a change (error) in the distance between the first lens and the second lens caused by thermal expansion, whereby there can be achieved a displacement information measuring apparatus utilizing Doppler effect which can highly accurately detect the displacement information of a moving object.

What is claimed is:

1. An apparatus for measuring information about displacement of an object to be measured, comprising:

a light source emitting a light beam, wherein a wavelength of the light beam emitted from said light source is varied by a temperature change;

a diffraction grating for diffracting the light beam from said light source;

an optical system for deflecting the diffracted light beam from said diffraction grating and applying it to the object to be measured, said optical system having a first lens system and a second lens system;

a photodetector element for detecting scattered light subjected to a Doppler shift from the object to be measured to which the diffracted light beam is applied by said optical system, the information about the displacement of the object to be measured being measured on the basis of a Doppler signal obtained by the detection of the scattered light by said photodetector element; and a mounting mechanism for restricting the positional relation between said first lens system and said second lens system, said mounting mechanism varying the spacing between said first lens system and said second lens system by a temperature change, the coefficient of thermal expansion of at least some member of said mounting mechanism being set so that a variation in the spacing between said first lens system and said second lens system caused by a temperature change may substantially offset a variation in the Doppler signal attributable to the wavelength of the emitted light beam from said light source varied with the same temperature change.

2. The apparatus according to claim 1, wherein each of said first and second lens systems is comprised of a single lens.

3. The apparatus according to claim 1, wherein said mounting mechanism has a first holding member holding said first lens system, a second holding member holding said second lens system, and a base member differing in coefficient of thermal expansion from said first and second holding members and supporting said first and second holding members.

4. The apparatus according to claim 3, wherein said light source is a laser diode, said first and second holding members are formed of a magnesium alloy, and said base member is formed of aluminum.

5. The apparatus according to claim 1, wherein said mounting mechanism has a base member directly fixing said first lens system and said second lens system.

6. The apparatus according to claim 5, wherein said light source is a laser diode, and said base member is formed of brass.

7. The apparatus according to claim 1, wherein said first and second lens systems are spaced apart by the sum of the focal lengths thereof from each other.

8. An apparatus for measuring information about displacement of an object to be measured comprising:

a light source emitting a light beam, wherein a wavelength of the light beam emitted from said light source is varied by a predetermined environmental change;

a diffraction grating for diffracting the light beam from said light source;

an optical system for deflecting the diffracted light beam from said diffraction grating and applying it to the object to be measured, said optical system having a first lens system and a second lens system;

a photodetector element for detecting scattered light subjected to a Doppler shift from the object to be measured to which the diffracted light beam is applied by said optical system, the information about the displacement of the object to be measured being measured on the basis of a Doppler signal obtained by the detection of the scattered light by said photodetector element; and a mounting mechanism for restricting the positional relation between said first lens system and said second lens system, said mounting mechanism varying the spacing between said first lens system and said second lens system by a predetermined environmental change, the coefficient of thermal expansion of at least some member of said mounting mechanism being set so that a variation in the spacing between said first lens system and said second lens system caused by a predetermined environmental change may substantially offset a variation in the Doppler signal attributable to the wavelength of the emitted light beam from said light source varied with the same environmental change.

9. The apparatus according to claim 8, wherein each of said first and second lens systems is comprised of a single lens.

10. An apparatus for measuring information about the displacement of an object to be measured comprising:

a light source emitting a light beam, said light source wherein a wavelength of the light beam emitted from is varied by a temperature change;

a diffraction grating for diffracting the light beam from said light source;

an optical system for deflecting the two diffracted light beams from said diffraction grating and applying them to the object to be measured while making them cross each other, said optical system having a first lens system and a second lens system, interference fringes being created by said crossing;

a photodetector element for detecting scattered light subjected to a Doppler shift from the object to be measured to which the crossing diffracted light beams are applied by said optical system, the information about the displacement of the object to be measured being measured on the basis of a Doppler signal obtained by the detection of the scattered light by said photodetector element; and a mounting mechanism for restricting the positional relation between said first lens system and said second lens system, said mounting mechanism varying the spacing between said first lens system and said second lens system by a temperature change, the coefficient of thermal expansion of at least some member of said mounting mechanism being set so that a variation in the spacing between said first lens system and said second lens system caused by a temperature change may substantially offset a variation in the pitch of the interference fringes attributable to the wavelength of the emitted light beam from said first source varied with the same temperature change.

11. The apparatus according to claim 10, wherein the angle formed between said two diffracted light beams immediately after the emergence thereof from said diffraction grating and the angle of crossing by said optical system differ from each other.

* * * * *

UNITED STATES PATENT AND TRADEMARK OFFICE
CERTIFICATE OF CORRECTION

PATENT NO. : 5,737,070
DATED : April 7, 1998
INVENTOR(S) : Kato

It is certified that error appears in the above-identified patent and that said Letters Patent is hereby corrected as shown below:

Title page, Item
[56] <u>References Cited</u>:

FOREIGN PATENT DOCUMENTS

"4230885" should read --4-230885--.

COLUMN 1:

Line 14, "object in" should read --object. In--; and
    Line 48, "Grating" should read --grating--.

COLUMN 5:

Line 45, "that" should read --that which--.

Signed and Sealed this

Fifteenth Day of September, 1998

Attest:

BRUCE LEHMAN

*Attesting Officer*  *Commissioner of Patents and Trademarks*